US010873922B2

(12) United States Patent
Karlsson et al.

(10) Patent No.: US 10,873,922 B2
(45) Date of Patent: Dec. 22, 2020

(54) COMMUNICATION DEVICE AND METHOD FOR EXECUTION OF AT LEAST ONE POSITIONING FUNCTION IN A COMMUNICATION NETWORK

(71) Applicant: Sony Mobile Communications Inc., Tokyo (JP)

(72) Inventors: Peter C. Karlsson, Lund (SE); Magnus Persson, Flyinge (SE); Kåre Agardh, Rydebäck (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/085,219

(22) PCT Filed: Mar. 17, 2016

(86) PCT No.: PCT/EP2016/055867
§ 371 (c)(1),
(2) Date: Sep. 14, 2018

(87) PCT Pub. No.: WO2017/157448
PCT Pub. Date: Sep. 21, 2017

(65) Prior Publication Data
US 2019/0082415 A1    Mar. 14, 2019

(51) Int. Cl.
*H04W 64/00* (2009.01)
*H04W 72/12* (2009.01)
*H04L 5/00* (2006.01)

(52) U.S. Cl.
CPC ......... *H04W 64/003* (2013.01); *H04L 5/0051* (2013.01); *H04W 64/00* (2013.01); *H04W 72/1252* (2013.01); *H04W 72/1247* (2013.01)

(58) Field of Classification Search
CPC .......... H04W 4/00; H04W 4/30; H04W 4/38; H04W 8/06; H04W 8/10–18;
(Continued)

(56) References Cited

U.S. PATENT DOCUMENTS 9,155,027 B1* 10/2015 Liu ........................ H04W 48/08
2010/0135264 A1* 6/2010 Nilsson ................. H04W 74/08
370/338
(Continued)

FOREIGN PATENT DOCUMENTS

WO    02096142 A1    11/2002

OTHER PUBLICATIONS

International Search Report and Written Opinion from counterpart International Patent Application No. PCT/EP2016/055867, dated Nov. 14, 2016; 9 pages.

*Primary Examiner* — Sah Htun
(74) *Attorney, Agent, or Firm* — Tucker Ellis LLP

(57) ABSTRACT

The present invention relates to a communication device and to a method arranged to execute at least one positioning function in a communication network. According to the present invention, a positioning function execution time is determined, at which a transmission medium will be used for executing position transmissions, according to a positioning function execution time information. Further, the at least one positioning function is executed at the determined positioning function execution time by executing the at least one positioning function transmission via the transmission medium. The present invention relates also to a correspondingly arranged computer program product and to a correspondingly arranged computer-readable recording medium.

16 Claims, 8 Drawing Sheets

(58) Field of Classification Search
CPC ..... H04W 28/0252–10; H04W 52/0209–0296; H04W 72/044–14; H04W 74/04–0825; H04W 88/02–06; H04W 92/10; H04W 5/0051

See application file for complete search history.

(56) References Cited

U.S. PATENT DOCUMENTS

| | | | |
|---|---|---|---|
| 2012/0182886 A1* | 7/2012 | Ong | H04W 74/0816 370/252 |
| 2015/0018010 A1* | 1/2015 | Fischer | H04W 4/023 455/456.2 |
| 2015/0208444 A1* | 7/2015 | Park | H04W 74/0808 370/329 |
| 2016/0135055 A1* | 5/2016 | Bhorkar | H04W 16/14 455/454 |
| 2016/0157225 A1* | 6/2016 | Joshi | H04W 72/0446 370/329 |

\* cited by examiner

COMMUNICATION DEVICE AND METHOD FOR EXECUTION OF AT LEAST ONE POSITIONING FUNCTION IN A COMMUNICATION NETWORK

TECHNICAL FIELD

Present invention relates to communication in a communication network and, particularly, to execution of at least one positioning function in the communication network. Especially, the present invention relates to a communication device and to a method for execution of at least one positioning function in the communication network. Additionally, the present invention relates to a corresponding computer program product and to a corresponding computer-readable recording medium.

BACKGROUND

In today's environments, communication devices such as wireless communication devices, for example, are present everywhere. Thus, for example, watches, mobile phones, TV's, home automation devices etc. are capable of communicating with other devices. The communication includes transmission processes in which, for example, data comprising different kinds of information is transmitted. Usually, communication or transmission processes respectively are executed by use of and based on appropriate communication protocols. A plurality of communication protocols for different communication networks is present (e.g., Wireless Local Area Network (WLAN), Bluetooth etc.). Coming versions of communication protocols, particularly, of wireless communication protocols will include positioning methods or functions respectively. Such protocols concern, for example, WLAN as defined by IEEE (e.g., by task group 802.11az) or protocols of the Wi-Fi Alliance that is working on Wi-Fi Aware R2.

In general, positioning methods or functions respectively are well known. They measure, for example, at least distances and/or angles from a sender to a receiver in a communication network. The positioning methods/functions comprise, for example, high accuracy ranging (e.g., Fine Time Measurements (FTM) etc.) and/or direction determining (e.g., Angle of Arrival (AOA), Direction of Arrival (DOA), etc.). The positioning methods/functions may be network-based or terminal-based or may be a combination of network-based and terminal-based positioning techniques. Network-based positioning means that the positioning methods/functions are started from network side, particularly by a device of the communication network like a base station, for example, or further communication network node. Terminal-based positioning means that the positioning methods/functions are started from user side, particularly by a communication device of a user like a mobile communication device (e.g., mobile phone, laptop etc.) or a stationary communication device of a user (e.g., home automation device).

There are inherent issues to achieve high accuracy when using positioning methods/functions. One physical constraint is, for example, the presence of the radio frequency multipath, i.e. the radio waves bounce around in the environment making direction and range estimates inaccurate. Another critical constraint is the increased time that is required to perform signalling measurements within the scope of the positioning methods/functions. Signalling measurements compete with data communication and, further, congest the radio frequency environment. This leads to overheads and less efficient communication in communication networks.

Thus, an appropriate scheduling of the execution of positioning functions/methods is needed that overcomes the above-indicated constraints or disadvantages respectively.

SUMMARY

The present invention enables positioning function/method execution scheduling as desired. The general idea of the present invention is to use certain time (e.g., time period(s), time slot(s), time window(s) etc.) for the execution of at least one position function/method. This time may be, for example, unutilized and/or less important airtime. In this way, a positioning function/method execution scheduling is provided that improves positioning function/method execution. Particularly, the execution of positioning functions/methods can be done without affecting network capacity, throughput and/or quality of service for critical applications and/or services in the communication network.

The present invention refers at least to communication device, method, computer program product and computer program product as specified in independent claims, the further arrangements of which are exemplary specified in dependent claims as well as in the following description and attached figures.

In particular, the present invention refers to a communication device arranged to execute at least one positioning function in a communication network, wherein the communication device is configured to: determine a positioning function execution time, at which a transmission medium will be used for executing position transmissions, according to a positioning function execution time information; and execute the at least one positioning function at the determined positioning function execution time by executing the at least one positioning function transmission via the transmission medium.

Further, the present invention relates to a method for execution of at least one positioning function in a communication network, said method comprising: determining a positioning function execution time, at which a transmission medium is used for executing position transmissions, according to a positioning function execution time information; and executing the at least one positioning function at the determined positioning function execution time by executing the at least one positioning function transmission via the transmission medium. In general, the method is executed by a communication device as indicated above and as explained in more detail in the following. Thus, the method comprises in general steps that are executed by the communication device and that are described in the present application.

According to an embodiment of the present invention, the position function execution time information indicates at least one of the following: a time, at which the transmission medium will not be used; and/or a defined time, at which the execution of the at least one positioning function may be started via the transmission medium in the communication network.

According to an embodiment of the present invention the time, at which the transmission medium will not be used, and/or the defined time comprises at least one time slot, at least one time window or at least one time point; and/or the time, at which the transmission medium will not be used, and/or the defined time is defined with regard to a communication interval.

According to an embodiment, the communication device is configured to determine the positioning function execution time: as the time, at which the transmission medium will not be used, or as the defined time; by applying a constant time offset to the defined time or to the time, at which the transmission medium will not be used; and/or as a time, at which the transmission medium has not been used for a certain time period.

According to an embodiment, the transmission medium is considered as being not used if: a positioning function transmission priority is higher than a priority of each of at least one further transmission waiting for a transmission via the transmission medium; and/or the transmission medium is not used for data transmission.

According to a further embodiment, the data transmission comprises a transmission of data of at least one application executed by the communication device and/or a transmission of data of at least one service executed by the communication device.

Further, according to an embodiment, each the positioning function transmission priority and the priority of each of the at least one further transmission is specified according to a corresponding transmission medium access category of at least two transmission medium access categories, each of the at least two transmission medium access categories classifying particular transmission services, wherein each transmission service is associated with one transmission medium access category only, and each transmission medium access category allocating at least one corresponding priority, wherein each priority is associated with one transmission medium access category only.

According to an embodiment of the present invention, the communication device is configured to: determine the positioning function execution time information; receive a message from another communication device of the communication network, said message indicating the positioning function execution time information; and/or to transmit a message to at least one further communication device of the communication network, said message indicating the determined positioning function execution time information.

According to an embodiment, the communication device is configured to determine the positioning function execution time information by: monitoring information on current and/or intended transmission activities on the transmission medium; analyzing information on current and/or intended transmission activities on the transmission medium; receiving information on current and/or intended transmission activities on the transmission medium; and/or detecting at least one time at which the transmission medium will not be used.

According to a further embodiment, the information on current and/or intended transmission activities on the transmission medium comprises at least one of the following: at least one transmission schedule of the communication device and/or of at least one further communication device of the communication network on the transmission medium, wherein the at least one transmission schedule indicates current and/or coming transmissions on the transmission medium; at least one application and/or service executed by the communication device and performing transmissions on the transmission medium; at least one transmission schedule of the at least one application and/or service executed by the communication device and performing transmissions on the transmission medium; information on wakeup and/or active times of the communication device and/or at least one further communication device; and/or information on free time windows and/or free time slots on the transmission medium.

It is noted that the term "schedule" designates a timetable. It represents a basic time-management tool. In particular, a schedule consists of a list of times at which possible tasks, events and/or actions are intended to take place, or of a sequence of tasks, events and/or actions in the chronological order in which said tasks, events and/or actions are intended to take place. Thus, a "transmission schedule", as a specific case of the "schedule" also represents a timetable. In particular, a "transmission schedule" consists of a list of times at which possible transmission tasks, transmission events and/or transmission actions are intended to take place, or of a sequence of transmission tasks, transmission events and/or transmission actions in the chronological order in which said transmission tasks, transmission events and/or transmission actions are intended to take place. The process of creating a schedule, comprising deciding on how to order the tasks, events and/or actions and/or deciding on how to commit resources between the variety of possible tasks, events and/or actions, is referred to as "scheduling".

According to an embodiment of the present invention, the communication device is a device of: a network comprising equally privileged communication devices; and/or a neighbor awareness network.

According to an embodiment, the communication device is a user communication device or a communication network device.

The present invention refers also to a computer program product comprising computer readable program code that is configured to cause a computing device to execute steps of the method as introduced above and as described in more detail below. According to an embodiment, the computer readable program code is embodied in a computer-readable medium. According to a further embodiment, the computer-readable medium is a non-transitory computer-readable medium. According to an embodiment, the computing device is a processor or any other computer configured to execute computer readable program code.

Moreover, the present invention refers also to a computer-readable recording medium configured to store therein the above-introduced computer program product. According to an embodiment, the computer-readable medium is a non-transitory computer-readable medium.

It has to be noted that, while some embodiments are described in the context of particular communication networks and/or communication protocols, the techniques disclosed herein may also be correspondingly employed for other network techniques, i.e. communication networks and/or communication protocols.

BRIEF DESCRIPTION OF THE DRAWINGS

In the following, embodiments of the present invention are described with reference to accompanying drawings in which the same or similar reference numerals designate the same or similar elements.

DETAILED DESCRIPTION OF EMBODIMENTS

In the following, exemplary embodiments of the present invention are described with reference to the attached drawings. While some embodiments are described in the context of specific fields of application, e.g., in the context of certain communication techniques, the embodiments are not limited to this field of application. Features of the various embodiments may be combined with each other unless specifically stated otherwise.

Figure 1:
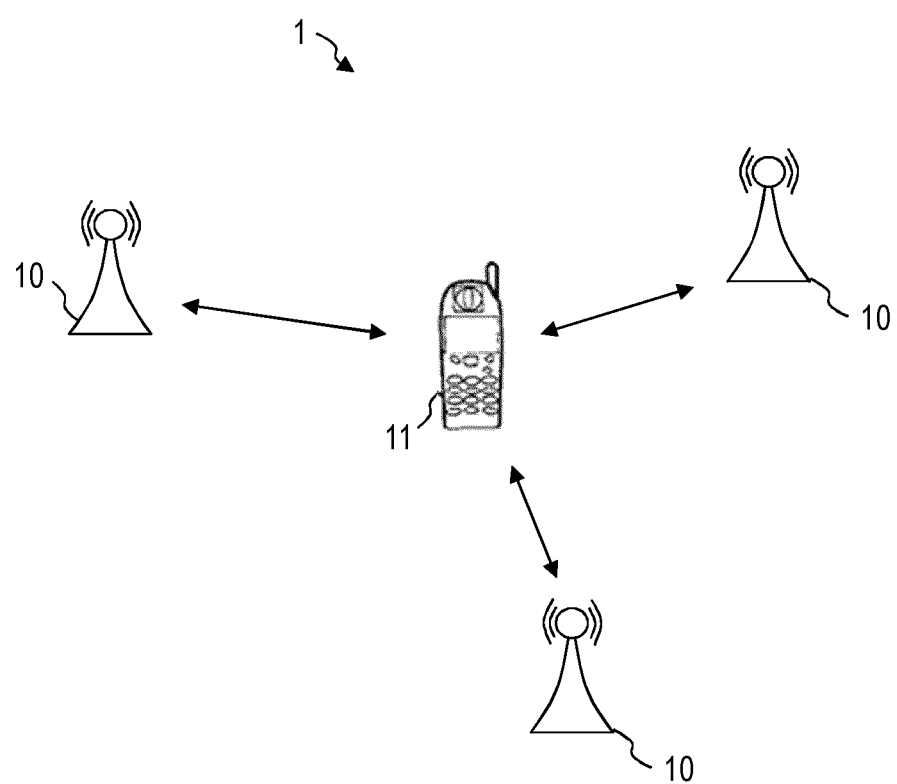
FIG. 1 is a schematic view of a communication network, in which the present invention is implemented according to an embodiment of the present invention.

FIG. 1 is a schematic view of a communication network 1, in which the present invention is implemented according to an embodiment. The communication network 1 comprises a plurality of communication devices 10, 11, capable of communicating, i.e. executing transmissions like data transmissions, for example. According to the present embodiment, the communication network 1 is a wireless communication network. Thus, communications in the network 1 comprise wireless transmissions. The communication network 1 allows communication, i.e. transmission execution according to different communications protocols, which may refer, for example, to WLAN, Bluetooth etc. In FIG. 1, a communication device 10, 11 may be in general a user communication device (e.g., a computer; laptop; mobile phone; machine-type device such as home automation device, smart meter etc.; watch; smartphone; etc.) or a communication network device (e.g., a base station, access point, etc.). Further, a communication device 10, 11, as shown in FIG. 1, is a mobile device or a stationary device. The exemplary communication network 1 of FIG. 1 comprises three communication network devices 10 and one user communication device 11. In the communication network 1 of FIG. 1, each of the three kinds of positioning functions— network-based positioning, terminal-based positioning, and a combination thereof—may be executed. According to the network-based positioning, tracking and evaluation of the user communication device 11 location is executed by use of communication network devices 10. For this purpose, the user communication device 11 sends either a signal to the communication network devices 10 or is sensed by the communication network devices 11. According to the terminal-based positioning, the location is calculated by the user communication device 11 itself from signals received from communication network devices 10 (e.g., base stations or other network nodes). The positioning functions executed in the communication network 1 comprise any kind of positioning functions (see, for example, the introduction above). They comprise, for example, cell of origin (COO), cell-id, location signature, location beacons, time of arrival (TOA), time difference of Arrival (TDOA), enhanced observed time difference (E-OTD), angle of arrival (AOA), direction of arrival (DOA), fine time measurements (FTM) etc. Present invention is not limited to the execution of particular positioning functions only and allows a corresponding execution of any function or method falling in the category of positioning functions or methods.

Because positioning functions may be initiated by user communication devices as well as by communication network devices, the more general term "communication device" is used in the present invention and indicates any of the two kinds of communication devices.

Figure 2:
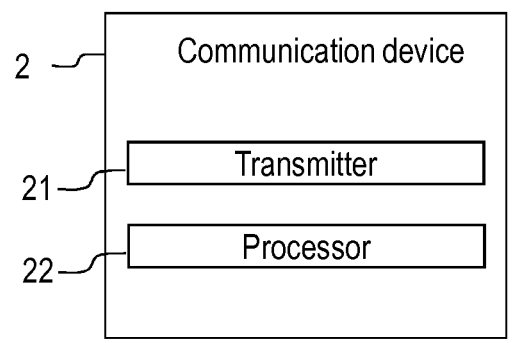
FIG. 2 is a block diagram of a communication device according to an embodiment of the present invention.

FIG. 2 is a block diagram of a communication device 2 according to an embodiment of the present invention. According to a further embodiment, the communication device 2 is a communication network device 10. According to another embodiment, the communication device 2 is a user communication device 11. The communication device 2 of FIG. 2 comprises a transmitter 21 that is configured to execute transmissions, e.g., data transmissions. The transmissions refer to both the reception and the sending of data, i.e. of different kinds of information. The communication device 2 of FIG. 2 comprises further a processor 22 that is configured to perform any of the steps executed by the communication device 2, apart from the transmissions executed by the transmitter 21. According to an embodiment, the communication device 2 (e.g., processor 22) is configured to execute at least one application. According to a further embodiment, the communication device 2 (e.g., processor 22) is configured to execute at least one service. In another embodiment, the communication device 2 (e.g., processor 22) executes both at least one application and at least one service. The application and/or the service execution on the communication device 2 may require executions of corresponding (data) transmissions in the communications network 1. Corresponding application and/or service data may be sent to and/or received from other communication devices (e.g., devices 10, 11, 2) of the communications network, for example.

The processor 22 and the transmitter 21 are configured to exchange data or information respectively. In particular, the processor 22 provides data/information to be transmitted, i.e. to be sent to the transmitter 21. The transmitter 21 provides received data/information to the processor 22 for corresponding further processing. The transmissions are executed via at least one transmission medium such as a communication way and/or channel (not shown).

Figure 3:
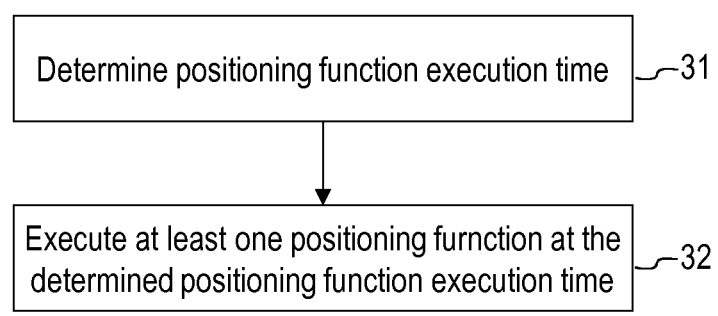
FIG. 3 is a flowchart showing steps for execution of at least one positioning function in a communication network according to an embodiment of the present invention.

FIG. 3 is a flowchart with steps for execution of at least one positioning function in a communication network (e.g., network 1 of FIG. 1) according to an embodiment. The steps are executed by a communication device (e.g., at least one of the above-introduced communication devices 10, 11, 2).

According to FIG. 3, a positioning function execution time is determined in step 31, at which a transmission medium will be used for executing position transmissions. This determining 31 is executed according to a positioning function execution time information. This means that the positioning function execution time information is used for said determining 31. Thus, the result of the determining step 31 depends on the positioning function execution time information, in particular, on the content of the positioning function execution time information, as will be explained in more detail below.

After the determining 31 of the positioning function execution time, the communication device executes at least one positioning function at the determined positioning function execution time. According to an embodiment, the at least one positioning function, executed at the determined positioning function execution time, is a positioning function of the communication device that waited for the execution until the determined positioning function execution time.

Figure 4:
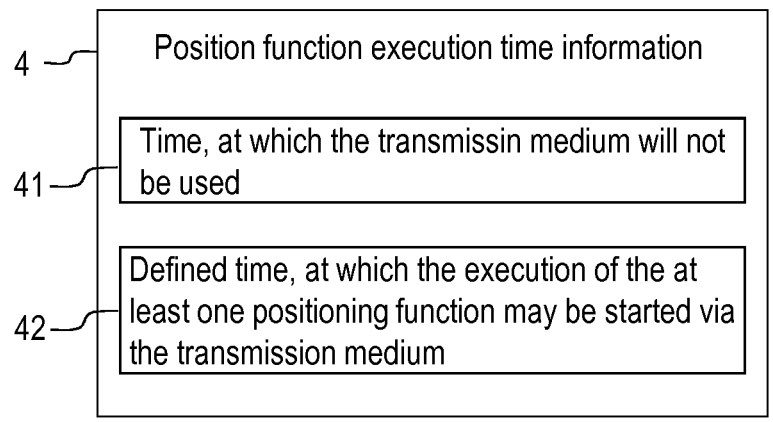
FIG. 4 is a block diagram of a position function execution time information according to an embodiment of the present invention.

FIG. 4 is a block diagram of a position function execution time information 4 according to an embodiment of the present invention. In FIG. 4, the position function execution time information 4 indicates at least one of the following: a time 41, at which the transmission medium will not be used; and/or a defined time 42, at which the execution of the at least one positioning function may be started via the transmission medium in the communication network. For sake of completeness, FIG. 4 shows both time 41 and defined time 42. According to further embodiments, the position function execution time information 4 comprises only one of the time information 41, 42. According to another additional embodiments, the position function execution time information 4 comprises also further information that might help to determine the positioning function execution time. As indicated by the term "defined", the term "defined time" specifies a certain, e.g., predetermined time.

According to further embodiments, the time 41, at which the transmission medium will not be used, and/or the defined time 42 comprise at least one time slot, at least one time window and/or at least one time point. According to further embodiments, the time, at which the transmission medium will not be used, 41 and/or the defined time 42 is defined with regard to a communication interval.

According to an embodiment, the communication device (e.g., device 10, 11, 2) is configured to determine 31 the positioning function execution time as the time 41, at which the transmission medium will not be used, or as the defined time 42. According to another embodiment, the communication device (e.g., device 10, 11, 2) determines 31 the positioning function execution time by applying a constant time offset to the defined time 42 or to the time 41, at which the transmission medium will not be used. According to a further embodiment, the communication device (e.g., device 10, 11, 2) determines 31 the positioning function execution time as a time, at which the transmission medium has not been used for a certain time period. The certain time period may be a predetermined time period. The communication device (e.g., device 10, 11, 2) may be configured to execute one, two or all of the above-indicated determining 31 alternatives. According to an embodiment, the decision, which of the alternatives is executed, is met by the communication device (e.g., device 10, 11, 2) in view of the communication network 1 used for communications/transmissions and its implementation.

The determining, whether the transmission medium is considered as being used or not may be done in several ways. According to an embodiment, the determining is executed by the communication device (e.g., device 10, 11, 2). In following, two possible ways of said determining are shown. The communication device (e.g., device 10, 11, 2) may be configured to execute one or both of them.

According to an embodiment, the transmission medium is considered as being not used in view of priorities assigned to transmissions waiting for a transmission via the transmission medium. According to this embodiment, the transmission medium is considered as being not used if a positioning function transmission priority is higher than a priority of each of at least one further transmission waiting for a transmission via the transmission medium. According to a further arrangement of this embodiment, each the positioning function transmission priority and the priority of each of the at least one further transmission is specified according to a corresponding transmission medium access category of at least two transmission medium access categories. Each of the at least two transmission medium access categories classifies particular transmission services, and each transmission service is associated with one transmission medium access category only. Further, each transmission medium access category allocates at least one corresponding priority, and each priority is associated with one transmission medium access category only.

According to another embodiment the transmission medium is considered as being not used if it is not used for data transmission. According to an embodiment, the data transmission comprises a transmission of data of at least one application executed by the communication device and/or a transmission of data of at least one service executed by the communication device.

Figure 5:
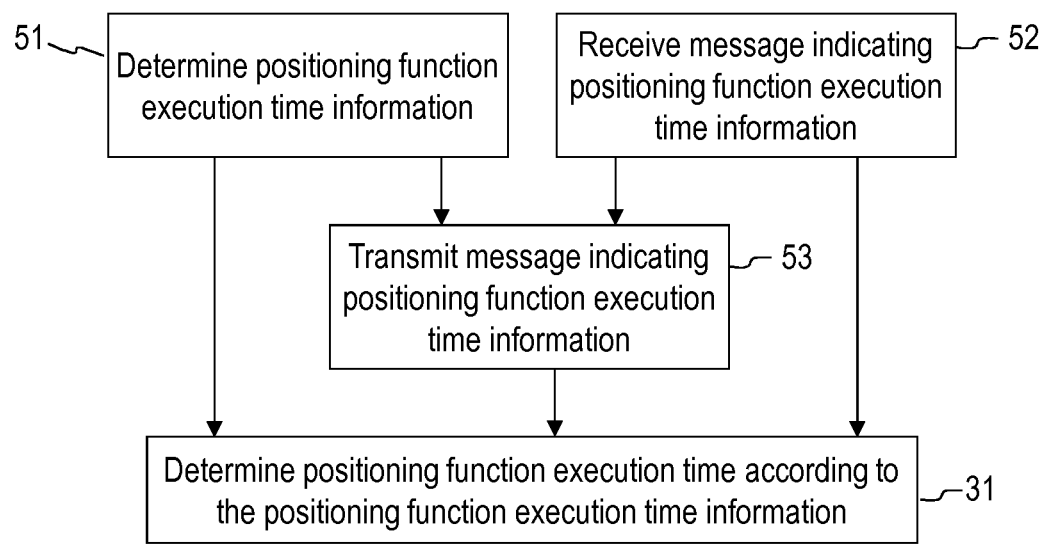
FIG. 5 is a flowchart of steps executed to obtain a position function execution time information according to an embodiment of the present invention.

FIG. 5 is a flowchart of steps 51 to 53 executed to obtain a position function execution time information according to an embodiment. The position function execution time information may be arranged as described in the present application. According to the embodiment of FIG. 5, said steps are executed prior the step 31, at which position function execution time is determined according to the position function execution time information. In FIG. 5, arrows from the steps 51 to 53 lead directly to the step 31. This, however does not mean that an execution of further steps that are not shown in FIG. 5 after the execution of steps 51 to 53 and before the execution of the step 31 is excluded. According to a further embodiment, steps of FIG. 5 are executed by the communication device (e.g., device 10, 11, 2) as described in the present application.

The embodiment of FIG. 5 shows exemplary two alternative steps 51, 52 for obtaining the position function execution time information at a communication device. The communication device may be configured to execute one or both of the two alternative steps 51, 52. According to a first alternative of the embodiment of FIG. 5, the positioning function is determined 51 by the communication device itself, according to the second alternative of the embodiment of FIG. 5, the communication device receives 52 a message (e.g., from a further communication device of the communication network) that indicates (e.g., comprises) the positioning function execution time information. Further, the communication device can be arranged to inform at least one further communication device of the communication network about the obtained positioning function execution time information. This is indicated in FIG. 5 by step 53, according to which the communication device is configured to transmit a message indicating (e.g., comprising) the positioning function time information as obtained, for example, in steps 51, 52. The execution of step 53 is not mandatory for every embodiment of the present invention and it can be refrained from its execution. Its execution may depend on the arrangement of the communication network, as will be shown with regard to a further embodiment. After each of the steps 51 to 53 and, particularly, after obtaining 51, 52 the positioning function execution time information, the position function execution time is determined 31 according to the positioning function execution time information.

Figure 6:
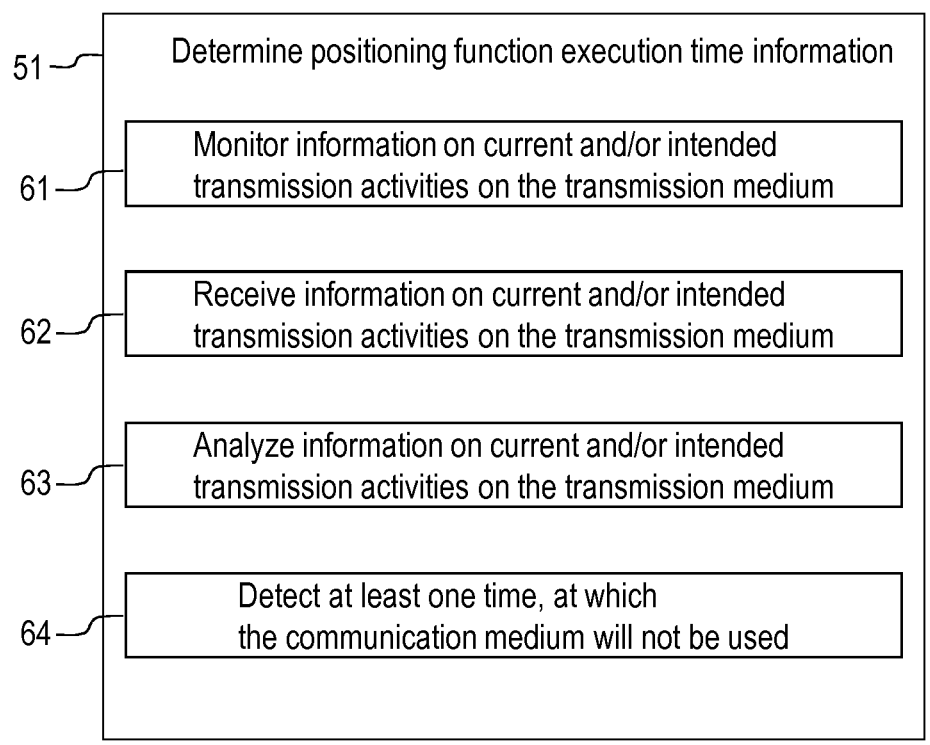
FIG. 6 is a block diagram of a position function execution time information determining step according to an embodiment of the present invention.

FIG. 6 is a block diagram of a position function execution time information determining step 51 according to an embodiment of the present invention. Particularly, FIG. 6 shows exemplary sub-steps 61 to 64 of the determining step 51 that the communication device (e.g., device 10, 11, 2) of the present invention may execute. According to the present embodiment, the communication device is configured to execute each of the sub-steps 61 to 64. Further embodiments of the present invention, however, allow also the execution of at least one of said sub-steps 61 to 64.

In a first line, the position function execution time information (e.g., information 4) as described in the present application is determined in step 51. For this purpose, the communication device is configured to monitor 61, to receive 62 and/or to gather, determine and/or collect in other appropriate ways (not explicitly shown in FIG. 6, but also covered by the present invention) information on current and/or intended transmission activities on the transmission medium.

Intended transmission activities comprise, for example, activities that will be executed by use of the transmission medium, i.e. by executing transmissions via the transmission medium. These activities may comprise particular data transmissions (e.g., data transmissions, wherein data may comprise, for example, data/information of application(s) and/or service(s) executed by the communication device), execution of communication device's functions/methods that require transmissions via the transmission medium, and/or possible execution of communication device's functions/methods, which may become necessary in view of changes in the communication device and/or in the communication network. For example, status or operation of the communication device may change (e.g., the transitioning from a sleep or low power mode to a wake-up mode). This status or operation change (from current status/operation to new status/operation) may cause the communication device to execute activities (e.g., functions/methods) that are usually executed with regard to and/or during the new status/operation and/or that are executed with regard to and/or during the change.

Intended transmission activities on the transmission medium comprise also such transmission activities that are already determined to be executed via the transmission medium. For example, a transmission schedule information provides information on transmissions that will be executed via the transmission medium.

According to the present embodiment, the information on current and/or intended transmission activities on the transmission medium comprises at least one of the following: at least one transmission schedule of the communication device and/or of at least one further communication device of the communication network on the transmission medium, wherein the at least one transmission schedule indicates current and/or coming transmissions on the transmission medium; information on wakeup and/or active times of the communication device and/or at least one further communication device; and/or information on free time windows and/or free time slots on the transmission medium. According to further embodiments, also further appropriate information that informs about current and/or intended transmission activities is used.

According to the present embodiment, the communication device also monitors or detects 61 and/or receives 62 information on recurring transmission activities. Such recurring transmission activities on the communication medium comprise, for example, transmission of beacons, Wi-Fi Multimedia (WMM) transmissions and/or Wireless Multimedia Extensions (WME) transmissions. In general, recurring transmission activities comprise transmission activities that are usually executed by the communication device and/or the execution of which is determined and/or might be awaited. As the term "recurring" says, the recurring transmission activities comprise transmissions that are executed via the transmission medium again and again. E.g., they are executed periodically and/or in response to particular events, changes and/or conditions.

By executing the steps 61 and/or 62, the communication device collects different information on current and/or intended transmission activities on the transmission medium. Further, the communication device analyses 63 this information. E.g., the communication device determines what current and/or intended transmission activities are and/or will be executed at which time. The communication device detects 64 at least one time, at which the communication medium will not be used, wherein the determining whether the communication medium is used or not is done as described in the present application. According to the present embodiment, the detecting step 64 is executed in view and/or by use of the results of the analysis 63 step. Particularly, the communication device detects 64 free time, at which the positioning function(s) may be executed.

The detected at least one time, at which the communication medium will not be used, is incorporated into the positioning function execution time information and/or is used as the positioning function execution time information.

Figure 7:
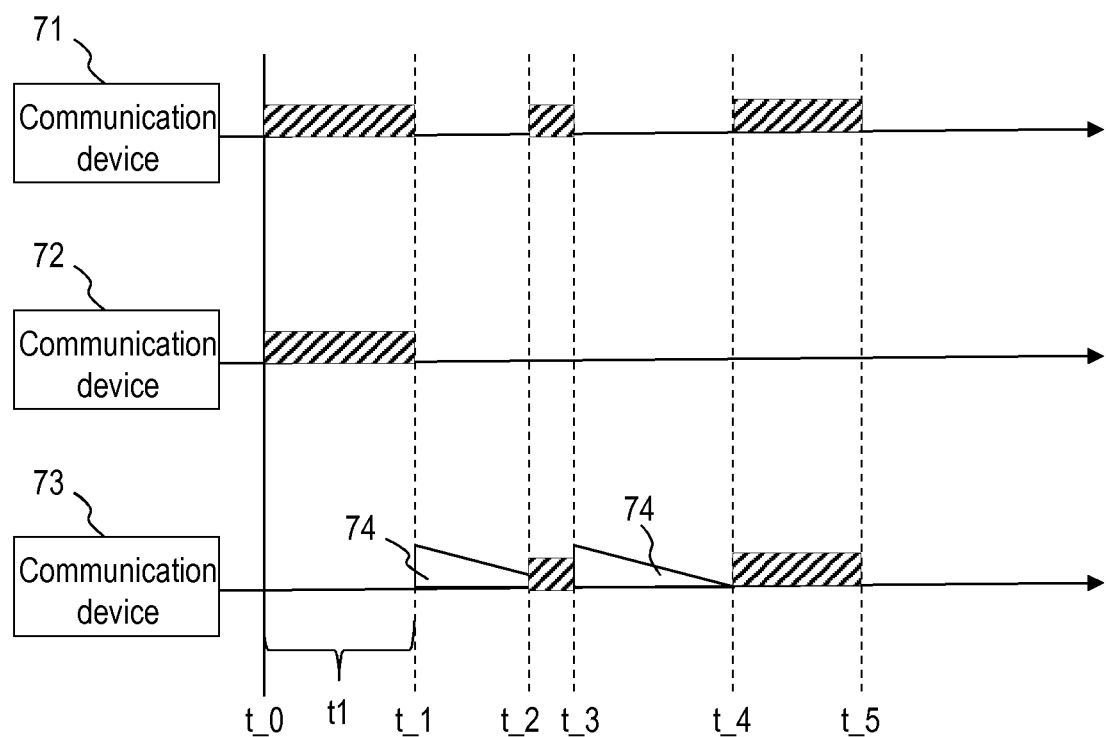
FIG. 7 shows an execution of at least one positioning function according to an embodiment of the present invention.

FIG. 7 shows an execution of at least one positioning function according to an embodiment of the present invention. In FIG. 7, the horizontal lines or arrows respectively represent time lines, while in the vertical direction three communication devices 71 to 73 of a communication network (e.g., network 1) are provided. Each of the three communication devices 71 to 73 may be arranged as described in the present application (see, for example, devices 10, 11, 2). According to the embodiment of FIG. 7, the communication device 73 desires to execute at least one positioning function. According to the present embodiment, the communication device 73 executes its positioning functions by communicating with the communication device 71, which may represent an access point of the communication network, for example. The communication is executed via a particular transmission medium (not shown), wherein, according to the present embodiment, also the communication device 72 uses said transmission medium and may communicate with the communication device 71 (e.g., an access point) via the transmission medium. Thus, a competitive situation with regard to the use of the transmission medium is present.

The communication network may be any wireless communication network. For example, it may be a WLAN, e.g., as specified by the IEEE in protocol 802.11, wherein the present embodiment is not restricted to this particular protocol and to the use of WLAN as network technique.

For executing the at least one positioning function, the communication device 72 determines (see, for example, step 51) the positioning function execution time information as described in the present application. For example, the communication device 72 detects and maps recurring events like Beacons, WMM power save communication etc. In this way, it senses for or detects (see, for example, step 64) free time where the positioning function(s) can be done. The determined positioning function execution time information indicates (e.g., comprises) the detected free time.

As shown in FIG. 7, at first, the communication device 72 uses the transmission medium for communicating with the communication device 71 during a time interval t1 starting at time point t_0 and ending at time point t_1. Both communication devices 71, 72 may transmit different data and information between each other.

The communication device 73 detects (see, for example, step 64) that transmission free time exists after the time point t_1. Because the execution of the positioning function(s) requires some time and because the communication device 73 wants to ensure that the transmission medium will be free for a longer time, according to the present embodiment, the communication device 73 waits a certain time period. The waiting starts at the time point t_1, i.e. at the time point at which the transmission medium is free for transmissions, i.e. is not used. According to a further embodiment, this certain time period is a predetermined time period. According to another embodiment, this certain time period is determined, by the communication device 73, for a (e.g., each) particular positioning function execution individually. In FIG. 7, the certain time period is indicated by a triangle 74.

As can be gathered in FIG. 7, before the expiry of the certain time period 74, the communication device 71 starts transmissions via the transmission medium at time point t_2. According to the present embodiment, data transmissions are started at the time point t_2 between the communication devices 71 and 73. Said data transmission may, for example, comprise transmissions of data of application(s) and/or service(s) executed by the communication device 73. Thus, the communication device 73 ends the verification whether the certain time period has expired or not. Said transmissions end at time point t_3.

Thus, at time point t_3, the transmission medium becomes free, i.e. it is not used, and the communication device 73 starts the waiting for a certain time period 74 again. At time point t_4, the certain time period 74 (starting at the time point t_3, i.e. at the time at which the transmission medium has become free/unused) expires. The communication device 73 uses the positioning function execution time information, indicating that the transmission channel has been free for the certain time 74, and determines (see, e.g., step 31) the time point t_4 as the positioning function execution time, and starts the execution (see, e.g., step 32) of the positioning function(s) at said positioning function execution time, i.e. at time point t_4 via the transmission media. The execution of the positioning function(s) ends at time point t_5 according to FIG. 7.

According to FIG. 7, the execution of positioning function(s) via the transmission medium comprises communications or transmissions respectively between the communication devices 73 and 71 via the transmission medium.

According to further embodiment, continuing the embodiment of FIG. 7, the waiting for a time period 74 can be implemented by a timer function. I.e., the communication device 73 may apply or execute a timer (e.g., a transmission media (e.g., channel) timer or a transmission media (e.g., channel) sensing timer) that is adjusted with regard to the expiry of the time period 74. Because the time period 74 concerns positioning function execution, which may have lower transmission priority than data transmissions, according to a further embodiment, the length of the time period 74 is set such that data transmissions, which may be executed a short time after the transmission medium has become free, will be executed first. Thus, the length of the time period 74 is adjusted such that it is longer than time periods used with regard to transmission like data transmissions (e.g., transmissions of application and/or service data).

A further embodiment, which continues the embodiment of FIG. 7 and/or the preceding embodiment, introduces the use of priorities, as already indicated above. Particularly, the transmissions required for the execution of the positioning function(s) may have priorities that are lower than priorities assigned to other transmissions, execution of which is more important. Such "other transmissions" comprise, for example, data transmissions (e.g., transmissions of application and/or service data).

According to an embodiment, enhanced distributed channel access (EDCA) access categories may be used. The EDCA access categories are defined, for example, in the IEEE 802.11 standard (see, for example, IEEE 802.11D and/or IEEE 802.11e). The access categories of the EDCA define priority levels for different kinds of transmissions. Thus, each transmission a corresponding priority is assigned, and the execution of the transmission is done according to the assigned priority. In the IEEE 802.11D standard, for example, the access categories are based on eight priority levels, which are as follows: priorities 1 and 2 for background traffic (access category "BK"); priorities 0 and 3 for best effort traffic (access category "BE"); priorities 4 and 5 for video traffic (access category "VI"); and priorities 6 and 7 for voice traffic (access category "VO") that is the highest priority level.

According to an embodiment of the present invention, prioritizing of the EDCA may be used. For this purpose, two alternative implementations are possible. According to a first alternative, a new access category is defined with regard to positioning function transmissions. According to an embodiment, this new access category is defined with a priority higher than background data (BK) but lower than real time video (VI). According to a second alternative, positioning function transmissions may be assigned to one of the existing access categories. According to an embodiment, the positioning function transmissions are assigned to the best effort (BE) access category.

Figure 8:
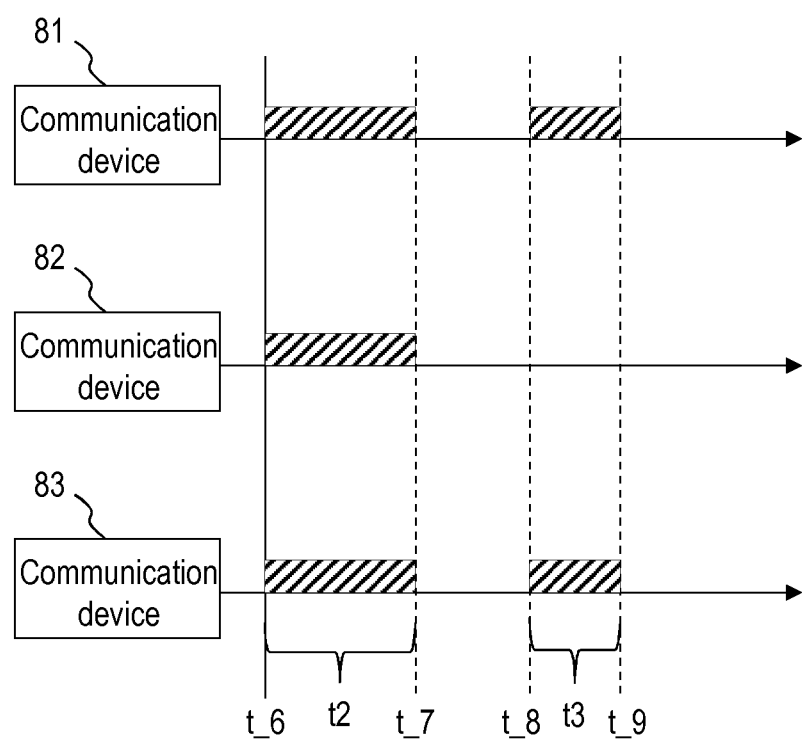
FIG. 8 shows an execution of at least one positioning function according to an embodiment of the present invention.

FIG. 8 shows an execution of at least one positioning function according to an embodiment of the present invention. Also in FIG. 8, horizontal lines or arrows respectively represent time lines, while in the vertical direction three communication devices 81 to 83 of a communication network (e.g., network 1) are provided. Each of the three communication devices 81 to 83 may be arranged as described in the present application (see, for example, devices 10, 11, 2, 71 to 73). According to the present embodiment, the communication devices 81 to 83 are equally privileged communication devices. Thus, they may be implemented as devices of a peer-to-peer network or as devices of a neighbour awareness network (NAN), for example. According to the present embodiment, activities of the equally privileged communication devices 81 to 83, said activities comprising also transmissions, are triggered by a coordinating device that might be (any) one of the communication devices 81 to 83. For this purpose, the coordinating device 81 to 83 transmits a corresponding trigger message comprising a time, at which the communication devices 81 to 83 can execute the corresponding activity/activities triggered by the trigger message. At this time, the communication devices 81 to 83 are awake and transmit (i.e. send and/or receive) the corresponding information.

According to the situation shown in FIG. 8, all communication devices 81 to 83 execute data transmissions (e.g., transmissions of application and/or service data) during time period t2, starting at time point t_6 and ending at time point t_7.

One of the communication devices 81 to 83 executes coordination of the positioning function execution as a corresponding coordinating device. For this purpose, the coordinating communication device 81 to 83 determines or obtains the positioning function execution time as described in the present application and transmits a message with positioning function execution time information indicating the determined or obtained positioning function execution time, at which the positioning function transmission execution via the transmission medium is intended.

According to an embodiment, the message is transmitted during a time period used by the communication devices 81 to 83 for data transmissions. According to a further embodiment, the message is a data transmission message. According to another embodiment, the message is arranged to transmit the positioning function execution time information without data. With regard to FIG. 8, the message is transmitted during the time period t2, used for data transmissions by the communication devices 81 to 83. According to this embodiment, the time period t2 represents also a trigger time or trigger time period respectively.

According to a further embodiment, the coordinating communication device 81 to 83 determines or obtains the positioning function execution time by applying a constant time offset to a time, at which the transmission medium will not be used, or to a particular (e.g., defined time).

In the embodiment of FIG. 8, the constant time offset is related to the trigger time or trigger time period t2 respectively. In particular, the constant time offset is applied to the end time point t_7 of the time period t2 and/or to the start time point t_6 of the time period t2, wherein at least in the latter case the duration of the time period t2 is taken into consideration such that any collision between data transmissions and positioning function related transmissions is avoided. I.e. the time for transmitting data does not overlap with the time for executing positioning function transmissions.

In the embodiment of FIG. 8, time point t_8 is determined as the positioning function execution time of the positioning function execution time information. A corresponding (triggering) message has been transmitted from the position function execution coordinating communication device 81 to 83, e.g., during the data transmission and/or trigger time t2. At the time point t_8, the position function execution coordinating communication device 81 to 83 as well as the other communications devices 81 to 83 that received the corresponding (triggering) message start the execution of the respective positioning functions and, thus, also the execution of the positioning function transmissions via the transmission medium. The positioning functions are executed during the time period t3 that ends at time point t_9. According to an embodiment, the positioning function execution time information indicates also the duration of the time period t3 and/or the end t_9 of the time period t3 besides the positioning function execution time t_8.

Figure 9:
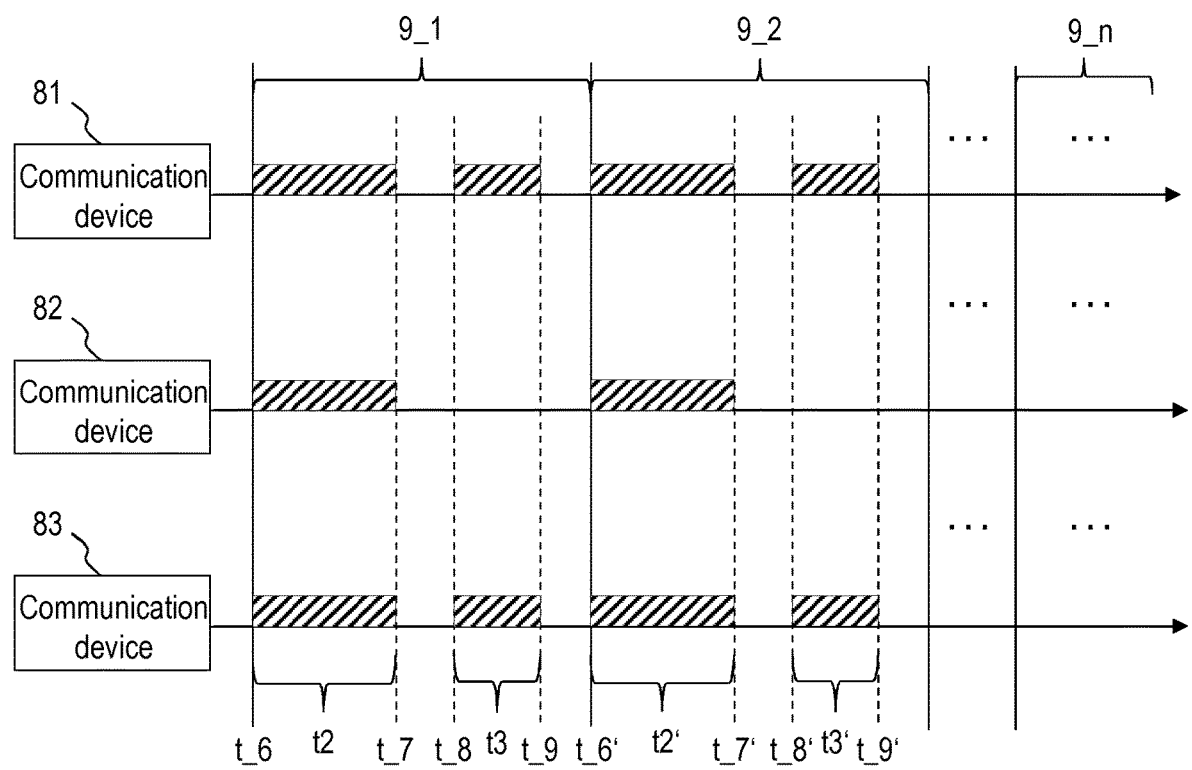
FIG. 9 shows an execution of at least one positioning function according to an embodiment of the present invention.

FIG. 9 shows an execution of at least one positioning function according to an embodiment of the present invention. The embodiment of FIG. 9 is based on the embodiment of FIG. 8. However, according to the embodiment of FIG. 9, the positioning function execution time is defined with regard to a communication interval 9_1, 9_2, . . . , 9_n; n being a natural that is larger or equal '1' or '2'. In view of the embodiment of FIG. 9, the data transmissions, comprising also the positioning function execution triggering as described above, are executed at the same time in a communication interval 9_1, 9_2, . . . , 9_n, said time being defined by the start time t_6, t_6' etc., by the period t2, t2', etc., and/or by the end time t_7, t_7' in the communication interval 9_1, 9_2, . . . , 9_n. Further, also the positioning functions are executed at the same time in a in a communication interval 91, 9_2, . . . , 9_n, said time being defined by the start time t_8, t_8' etc., by the period t3, t3', etc., and/or by the end time t_9, t_9' in the communication interval 9_1, 9_2, . . . , 9_n. According to an embodiment, the corresponding transmissions are executed at the corresponding times in each of the communication intervals 9_1, 9_2, . . . , 9_n. According to another embodiment, the corresponding transmissions are executed at the corresponding times in some of the communication intervals 91, 9_2, . . . , 9_n.

With regard to the embodiments of FIGS. 8 and 9, it has to be noted that, according further embodiments supplementing the embodiments of FIGS. 8 and 9, the execution of positioning function transmissions from multiple (i.e. more than one or two) communication devices may be grouped together. For example, they may be executed as a usual data communication. The grouping means that the positioning function transmissions are executed with regard to more than one of the communication devices 81 to 83. I.e. the corresponding transmitted messages or data comprise positioning function data or information of more than one of the communication devices 81 to 83. According to a further embodiment, the positioning function transmissions comprise positioning function data or information not only of more than one of the communication devices 81 to 83 but even of all communication devices 81 to 83.

Figure 10:
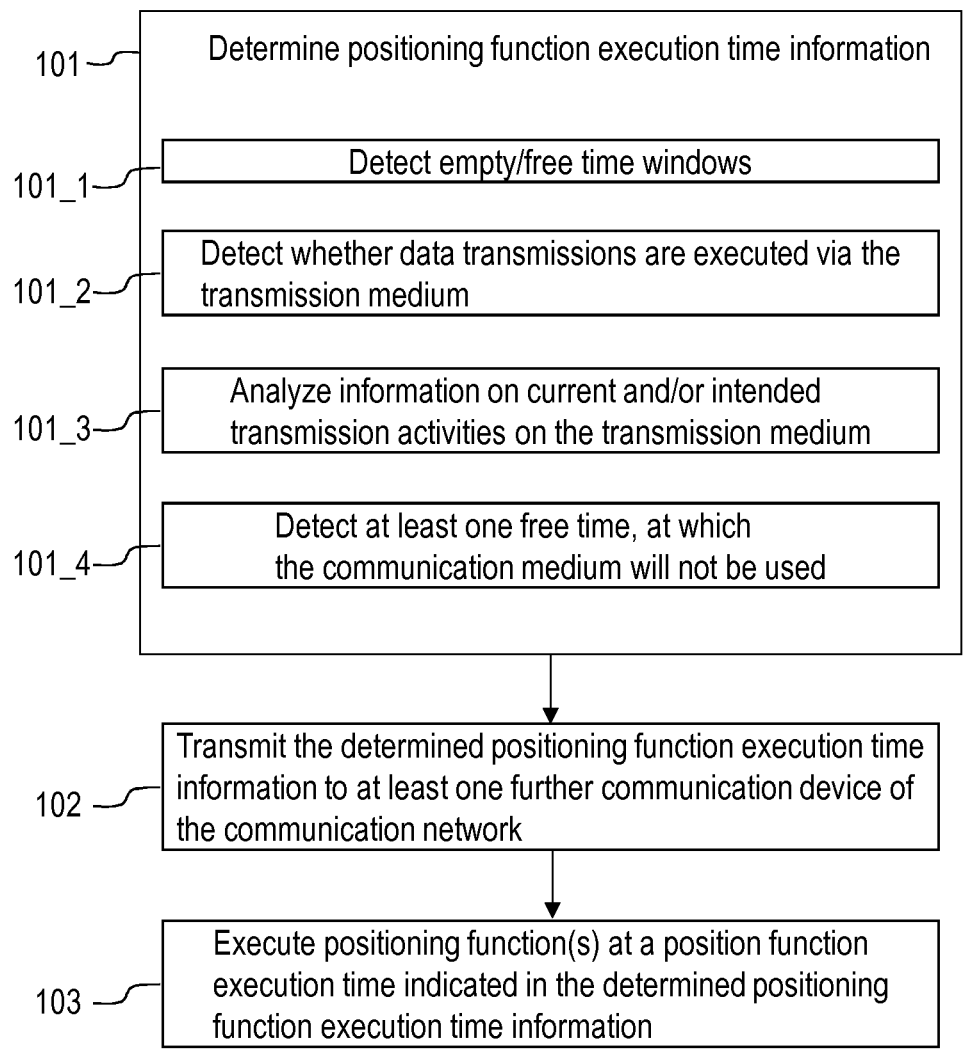
FIG. 10 shows an execution of at least one positioning function according to an embodiment of the present invention.

FIG. 10 shows an execution of at least one positioning function according to an embodiment of the present invention. The embodiment of FIG. 10 can be implemented, for example, with regard to communication networks, in which gaps in the communication, i.e. free time on a transmission medium exist. An example of such communication network is Bluetooth Low Energy (BT LE). It is defined, for example, by the standard IEEE 802.15.4.

According to the embodiment of FIG. 10, positioning function execution time information is determined 101, wherein the determining can be executed in general as described in the present application (see, e.g., step 51). The steps, shown in FIG. 10 are executed by a communication device arranged as described in the present application (see, e.g., devices 10, 11, 2, 71 to 73, 81 to 83). According to the present embodiment, in particular, time windows on the transmission medium are detected 101_1 that are empty or free respectively. Further, it is detected 101_2 whether data transmissions (e.g., transmissions of application and/or service data) are executed via the transmission medium or not. The information on transmission activities on the transmission medium as collected at least via the steps 101_1 and 101_2 is analysed for detecting at least one time such as a time window with regard to the transmission medium, which will not be used for transmissions, e.g., for data transmissions such as application and/or service data transmissions, and which, thus, can be used for executing positioning function transmissions. The information on the at least one free time, e.g., free time window as detected is then incorporated into the positioning function execution time information.

In step 102, the determined positioning function execution time information is transmitted to at least one further communication device of the communication network. Thus, the transmitting device and/or the at least one further communication device may start 103 execution of corresponding positioning function(s) at the time indicated in the positioning function execution time information.

If communication devices are arranged as equally privileged communication stations, e.g., as devices of a neighbour awareness network and/or of a peer-to-peer network (see also embodiments of FIGS. 8 and 9), data transmission messages or other messages transmitted as trigger messages can be used for transmitting the determined positioning function execution time information. For example, correspondingly arranged signalling bits may incorporated into the data transmission messages or other messages transmitted as trigger messages, wherein the signalling bits are used for storing and/or correspondingly encoding the positioning function execution time information.

Although the invention has been shown and described with respect to certain preferred embodiments, equivalents and modifications will occur to others skilled in the art upon the reading and understanding of the specification. The present invention includes all such equivalents and modifications, and is limited only by the scope of the following claims.

The invention claimed is:

1. A communication device arranged to execute at least one positioning function in a communication network, the communication device comprising:
  a processor that:
    detects and maps recurring transmission activities over a transmission medium; and
    executes an application to determine a positioning function execution time and schedule the communication device to transmit at least one position transmission via the transmission medium at the positioning function execution time, the positioning function execution time determined according to a positioning function execution time information that comprises information regarding recurring transmission times and the positioning function execution time is a time at which the transmission medium has not been used for a predetermined time period and does not coincide with a recurring transmission of the recurring transmission activities, wherein the transmission medium is considered as being not used if a positioning function transmission priority is higher than a priority of each of at least one further transmission waiting for a transmission via the transmission medium, and each the positioning function transmission priority and the priority of each of the at least one further transmission is specified according to a corresponding transmission medium access category of at least two transmission medium access categories, each of the at least two transmission medium access categories classifying particular transmission services, wherein each transmission service is associated with one transmission medium access category only, and each transmission medium access category allocating at least one corresponding priority, wherein each priority is associated with one transmission medium access category only; and
  a transmitter that transmits the at least one positioning function transmission via the transmission medium upon arrival of the positioning function execution time.

2. The communication device according to claim 1, wherein the position function execution time information indicates a time, at which the transmission medium will not be used.

3. The communication device according to claim 2, wherein:
  the time, at which the transmission medium will not be used comprises at least one time slot, at least one time window or at least one time point; and/or
  the time, at which the transmission medium will not be used is defined with regard to a communication interval.

4. The communication device according to claim 2, wherein the communication device is configured to determine the positioning function execution time:
  by applying a constant time offset to the time at which the transmission medium will not be used.

5. The communication device according to claim 1, wherein the data transmission comprises a transmission of data of at least one application executed by the communication device and/or a transmission of data of at least one service executed by the communication device.

6. The communication device according to claim 1, wherein the communication device is configured to:
  determine the positioning function execution time information.

7. The communication device according to claim 1, wherein the communication device is configured to determine the positioning function execution time information by:
  monitoring information on current and/or intended transmission activities on the transmission medium;
  analyzing information on current and/or intended transmission activities on the transmission medium;
  receiving information on current and/or intended transmission activities on the transmission medium; and/or
  detecting at least one time at which the transmission medium will not be used.

8. The communication device according to claim 7, wherein the information on current and/or intended transmission activities on the transmission medium comprises at least one of the following:
  at least one transmission schedule of the communication device and/or of at least one further communication device of the communication network on the transmission medium, wherein the at least one transmission schedule indicates current and/or coming transmissions on the transmission medium;
  at least one application and/or service executed by the communication device and performing transmissions on the transmission medium;
  at least one transmission schedule of the at least one application and/or service executed by the communication device and performing transmissions on the transmission medium; and/or
  information on free time windows and/or free time slots on the transmission medium.

9. The communication device according to claim 1, wherein the communication device is a device of:
  a network comprising equally privileged communication devices; and/or
  a neighbor awareness network.

10. The communication device according to claim 1, wherein the communication device is a user communication device or a communication network device.

11. The communication device according to claim 1, wherein the transmission medium is considered as being not used if:
  the transmission medium is not used for data transmission.

12. The communication device according to claim 1, wherein the communication device is configured to:
  receive a message from another communication device of the communication network, said message indicating the positioning function execution time information.

13. The communication device according to claim 1, wherein the communication device is configured to:
  transmit a message to at least one further communication device of the communication network, said message indicating the determined positioning function execution time information.

14. The communication device according to claim 1, wherein the positioning function execution time information is based on current and/or intended transmission activities on the transmission medium and comprises:
  information on wakeup and/or active times of the communication device and/or at least one further communication device.

15. A method for execution of at least one positioning function in a communication network, said method comprising:
  detecting and mapping recurring transmission activities over a transmission medium;
  determining a positioning function execution time and scheduling the communication device to transmit at least one position transmission via the transmission medium at the positioning function execution time, the positioning function execution time determined according to a positioning function execution time information that comprises information regarding recurring transmission times and the positioning function execution time is a time at which the transmission medium has not been used for a predetermined time period and does not coincide with a recurring transmission of the recurring transmission activities, wherein the transmission medium is considered as being not used if a positioning function transmission priority is higher than a priority of each of at least one further transmission waiting for a transmission via the transmission medium, and each the positioning function transmission priority and the priority of each of the at least one further transmission is specified according to a corresponding transmission medium access category of at least two transmission medium access categories, each of the at least two transmission medium access categories classifying particular transmission services, wherein each transmission service is associated with one transmission medium access category only, and each transmission medium access category allocating at least one corresponding priority, wherein each priority is associated with one transmission medium access category only; and
  executing the at least one positioning function to transmit the at least one positioning function transmission via the transmission medium upon arrival of the positioning function execution time.

16. A non-transitory computer readable medium that stores a computer program product comprising computer readable program code that is configured to cause a computing device to execute steps of method of claim 15.

* * * * *